US010427354B2

(12) United States Patent
Dikovsky et al.

(10) Patent No.: US 10,427,354 B2
(45) Date of Patent: Oct. 1, 2019

(54) METHOD AND APPARATUS FOR PRINTING THREE-DIMENSIONAL (3D) OBJECTS

(71) Applicant: STRATASYS LTD., Rehovot (IL)

(72) Inventors: Daniel Dikovsky, Rehovot (IL); Eduardo Napadensky, Netanya (IL); Shai Hirsch, Rehovot (IL); Evgeni Levin, Rehovot (IL); Yoav Bressler, Tel-Aviv (IL)

(73) Assignee: STRATASYS LTD., Rehovot (IL)

( * ) Notice: Subject to any disclaimer, the term of this patent is extended or adjusted under 35 U.S.C. 154(b) by 22 days.

(21) Appl. No.: 15/580,129

(22) PCT Filed: Jun. 7, 2016

(86) PCT No.: PCT/IL2016/050587
§ 371 (c)(1),
(2) Date: Dec. 6, 2017

(87) PCT Pub. No.: WO2016/199131
PCT Pub. Date: Dec. 15, 2016

(65) Prior Publication Data
US 2018/0297287 A1    Oct. 18, 2018

Related U.S. Application Data

(60) Provisional application No. 62/172,096, filed on Jun. 7, 2015.

(51) Int. Cl.
*B29C 41/02* (2006.01)
*B29C 64/393* (2017.01)
(Continued)

(52) U.S. Cl.
CPC .......... *B29C 64/393* (2017.08); *B29C 64/112* (2017.08); *B29C 64/386* (2017.08);
(Continued)

(58) Field of Classification Search
CPC ............... B29C 64/112; B29C 64/40
(Continued)

(56) References Cited

U.S. PATENT DOCUMENTS 6,259,962 B1    7/2001  Gothait
6,569,373 B2    5/2003  Napadensky
(Continued)

FOREIGN PATENT DOCUMENTS

CN    103394693 A    11/2013
EP    0 852 536 B1    9/2002
(Continued)

OTHER PUBLICATIONS

International Search Report for International Application No. PCT/IL2016/050587 dated Sep. 27, 2016.
(Continued)

*Primary Examiner* — Leo B Tentoni
(74) *Attorney, Agent, or Firm* — Pearl Cohen Zedek Latzer Baratz LLP

(57) ABSTRACT

Some embodiments of the invention may be related to a system and method of printing a three-dimensional (3D) object and a support construction for the 3D object. The system may include a printing unit and a supply system for supplying a body material and a support material to the printing unit. The system may further include a controller be configured to: generate 3D cross sectional digital data comprising a set of horizontal slices, to manipulate the 3D digital data to create a set of shifted slices by performing vertical shifts between body regions and support regions of a same horizontal slice to create printing digital data and to control the printing unit to deposit, in layers, the body material and the support material based on the printing digital data, wherein in a single scan, droplets of the support material and droplets of the body material travel different distances.

9 Claims, 10 Drawing Sheets

(51) Int. Cl.
    *B29C 64/40*     (2017.01)
    *B29C 64/386*     (2017.01)
    *B29C 64/112*     (2017.01)
    *B33Y 10/00*     (2015.01)
    *G06F 17/50*     (2006.01)
    *B33Y 30/00*     (2015.01)
    *B33Y 50/02*     (2015.01)
    *B29C 64/264*     (2017.01)
    *B29C 64/245*     (2017.01)

(52) U.S. Cl.
    CPC ............. *B29C 64/40* (2017.08); *B33Y 10/00* (2014.12); *G06F 17/5086* (2013.01); *B29C 64/245* (2017.08); *B29C 64/264* (2017.08); *B33Y 30/00* (2014.12); *B33Y 50/02* (2014.12); *G06F 2217/12* (2013.01)

(58) Field of Classification Search
    USPC .................................................. 264/308, 317
    See application file for complete search history.

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,599,846 B2 | 10/2009 | Fiedotin et al. |
| 2010/0033521 A1 | 2/2010 | Kritchman |
| 2010/0191360 A1 | 7/2010 | Napadensky et al. |
| 2013/0076817 A1* | 3/2013 | Olson .................... B41J 3/4073 347/12 |

FOREIGN PATENT DOCUMENTS

| | | |
|---|---|---|
| EP | 1637307 | 3/2006 |
| EP | 3181338 | 6/2017 |
| JP | 2004090530 | 3/2004 |
| JP | 2016198897 | 12/2016 |
| WO | WO 2011/144596 | 11/2011 |

OTHER PUBLICATIONS

Office Action for Chinese Patent Application No. 2016800406582 dated Sep. 5, 2018.

* cited by examiner

METHOD AND APPARATUS FOR PRINTING THREE-DIMENSIONAL (3D) OBJECTS

CROSS-REFERENCE TO RELATED APPLICATIONS

This application is a National Phase Application of PCT International Application No. PCT/IL2016/050587, International Filing Date Jun. 7, 2016, claiming priority of U.S. Provisional Patent Application No. 62/172,096, filed Jun. 7, 2015, which is hereby incorporated by reference.

BACKGROUND

In three-dimensional (3D) printing or 3D fabrication process, material is selectively jetted from one or more print heads and deposited onto a fabrication tray in consecutive layers according to a pre-determined configuration as defined by a software file. Some deposition processes include depositing different materials in order to form a single object or model. For example, an object may be deposited using a first material for depositing the body structure and a second material for depositing a support structure to support various sections of the body structure, for example, negative angle surfaces and overhangs. The support material is later being removed by mechanical, chemical or other means to reveal the final object.

Conventional deposition methods involve depositing the support material and the body material simultaneously layer by layer, according to the pre-determined configuration. Both the support material and the body material are deposited in a liquid or semi liquid state in the same layer, such that a liquid/liquid interface is formed between the two materials. After the deposition the deposited layers are hardened (e.g., by ultraviolet (UV) curing). The droplets of body material and support material create a mix layer and upon removal of the support material micro-cracks are left in the printed part (i.e. body material). The surface micro-cracks may lead to an increased stress under load and an increased brittleness of the printed parts. The rougher the surface the poorer the mechanical strength of the printed model.

SUMMARY

Some embodiments of the invention may be directed to a system and method of printing a three-dimensional (3D) object and a support construction for the 3D object. The system may include a printing unit comprising one or more print heads configured to deposit body material for forming the 3D object and support material for forming the support construction and a supply system for supplying the body material and support material to the printing unit. The system may further include a controller to execute methods according to some embodiments of the invention.

The controller may be configured to generate 3D cross sectional digital data comprising a set of horizontal slices, wherein each of the slices includes one or more body regions representing a horizontal cross section of the 3D object, and at least each of some of the slices further includes one or more support regions being adjacent to the body region and representing a corresponding horizontal cross section of the support construction.

The controller may further be configured to manipulate the 3D digital data to create a set of shifted slices by performing vertical shifts between the body region and the support region of a same horizontal slice to create printing digital data, wherein at least each of some of the shifted slices includes a body region of one of the horizontal slices together with a support region of another one of the horizontal slices; and controlling the printing unit to deposit, in layers, from the one or more printing heads, the body material and the support material based on the printing digital data, wherein in a single scan, droplets of the support material and droplets of the body material travel different distances.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
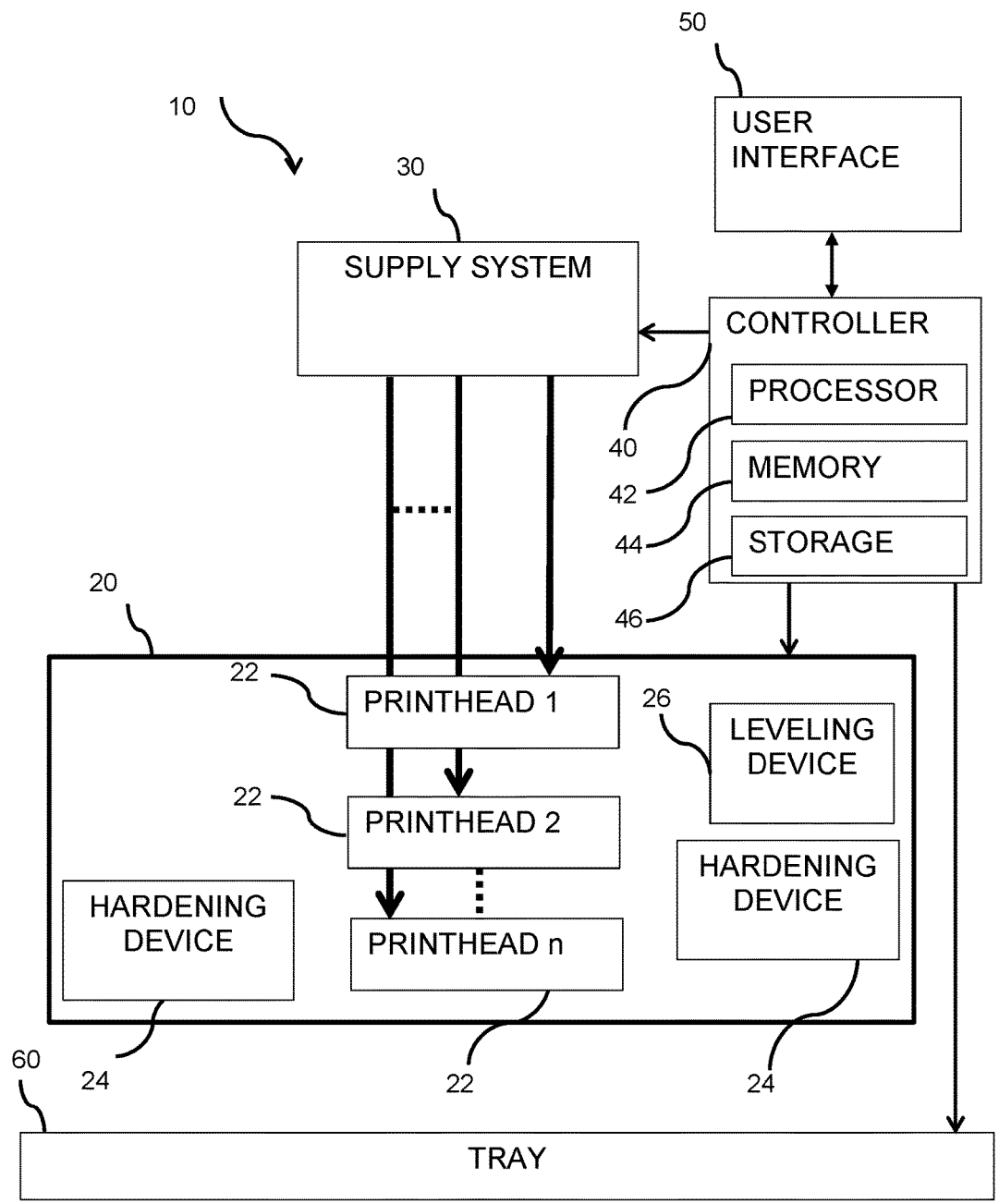
FIG. 1 is a diagrammatic representation of a printing system according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be directed to printing 3D models using ink-jet printing system. In order to print complex shapes, support material is deposited at desired areas to support the body material during the construction of the model. When the support material and body material are printed together in the same layer, a mixed interface comprising support material droplets and body material droplets is formed. After hardening of the printed layers, the interface formed between the support material and the body material is rough. Therefore, upon removal of the support material and revealing of the body structure, the surface of the body would also be rough and full of micro-cracks, which leads to a reduced mechanical strength and inferior mechanical properties.

In the common practice, droplets of body material and support material deposited together during a single scan may create a mixed interface and upon removing of the support material micro-cracks are left in the printed body part. The surface micro-cracks may lead to increased micro-stresses once under load and increased brittleness of the printed parts. The outcome of the common practice printing methods has inferior mechanical properties and finer (e.g., smoother) surface roughness.

In addition to the brittleness problem, irregular morphology of the resulting matte surfaces (i.e. rough surface as oppose to glossy surface) may cause the following problems: part distortion, lower accuracy, lower dimensional stability, higher water absorption, increased creep, non-uniform appearance and other undesirable optical effects. At least some of the above problems may be resolved by expensive and time consuming post-processing, such as sanding, polishing and lacquering.

Surface cracks may be caused by an overlap and/or intermixing between body material and support material droplets. Therefore, the prevention of direct contact between the support and modeling materials may eliminate the aforementioned problems. In some embodiments, the 3D printing process is modified and a delay is introduced between the deposition of the body materials and the support material. Such a process significantly improves the performance and appearance of the final printed part/s or object/s.

Free surfaces of a model or support materials that have been deposited without any mixed interface with another material may be smoother and have better mechanical properties. Occasionally, solid/solid interfaces and solid/liquid interfaces deposited in a layer by layer manner may result in coarse interface (mixed interface) having poorer mechanical properties.

Embodiments of the invention may be related to a system and method for printing a 3D object supported by a support construction such that substantially, no mixed interface is formed between a body material (forming the 3D object) and a support material (forming the support construction). A 3D object printed according to embodiments of the invention may have a smoother surface with less micro-cracks and better mechanical properties. A 3D digital data of the 3D object and the support construction may be generated to include horizontal slices comprising one or more body regions representing a horizontal cross section of the 3D object and optionally also one or more support regions being adjacent to the body region and representing a corresponding horizontal cross section of the support construction.

The 3D digital data may further be manipulated to create a set of shifted slices by performing vertical shifts between the body region and the support region to separate during printing the body regions from the support regions. In some embodiments, when printing the 3D object and the support structure according to the manipulated 3D digital data in a single scan, droplets of the support material and droplets of the body material may travel different distances. In a single scan, the body material may be deposited to form a first horizontal slice of a first height and the support material may be deposited to form a second horizontal slice being at a second height. In some embodiments, the second height may be higher than the first height by the vertical shift.

Reference is made to FIG. 1 presenting a diagrammatic representation of a system for depositing 3D objects according to some embodiments of the invention. A system 10 may include a printing unit 20, a supply system 30, a controller 40, a user interface 50 and a fabrication platform or a tray 60. Controller 40 may be configured to control all the other elements of system 10.

Printing unit 20 may include one or more print heads 22, for example, heads 1-$n$, one or more hardening devices 24, and one or more leveling devices 26. Print heads 22 may be configured to deposit material using any ink-jet method. Printing unit 20 may move horizontally in both X and Y directions and vertically in the Z direction.

Print heads 22 may include an array of two or more nozzles arranged, for example, in a single line or in a 2D array. Different print heads 22 may deposit different material such that two or more materials may be deposited at a single deposition scan. For example, print heads 1 and 2 may be configured to print support material and print heads 3 and 4 may be configured to print body material. Print heads 22 may be fed (with the deposition material) from supply system 30.

Hardening device 24 may include any device that is configured to emit light, heat and the like that may cause the printed material to hardened. For example, hardening device 24 may include one or more ultraviolet (UV) lamps for curing the deposited material. Leveling device 26 may include any device that is configured to level and/or establish a thickness of the newly formed layer by sweeping over the layer and removing excess material. For example, leveling device 26 may be a roller. Leveling device 24 may include a waste collection device (not illustrated) for collecting the excess material generated during leveling.

Supply system 30 may include two or more building material containers or cartridges for supplying a plurality of building materials to print heads 22. In some embodiments, the body material may be formed by mixing two or more base materials prior to the deposition of the body material from print heads 22. Each of the base materials may be held in a different container included in supply system 30. The two or more base materials may be mixed in an additional container prior to the feeding of print head 22 or may be fed together to print head 22 and mixed together during the deposition processes. Alternatively, each of the two or more base materials may be deposited from a different print head 22 at a single place (e.g., a plurality of droplets of different base materials may be deposited on the same spot) and mixed together after the deposition. A similar process may be implemented with respect to the material(s) forming the support construction, when the support material includes mixing of one or more base materials. The mixing process of the two or more based materials and other aspects of the material supply from supplying system 30 to print heads 22 may be controlled by controller 40.

Controller 40 may include a processor 42 that may be, for example, a central processing unit processor (CPU), a chip or any suitable computing or computational device. Controller 40 may further include: a memory 44 and storage unit 46. For example, processor 42 may control the movement of printing unit 20 at a desired direction. Memory 44 may include for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 44 may be or may include a plurality of possibly different memory units.

Memory 44 may include an executable code, e.g., an application, a program, a process, task or script. The executable code may include codes or instructions for controlling apparatus 10 to print 3D objects according to embodiments of the present invention. For example, memory 44 may include a code for depositing support material to form a first region of the 3D object, using for example, a first set of print heads 22, and harden the material in the first region using, for example, hardening device 24. The code may further include depositing body material in a second region of the 3D object horizontally adjacent to the first only after the material in the first region was hardened.

In some embodiments, memory 44 may include instruction to generate 3D cross sectional digital data comprising a set of horizontal slices. The instructions may further include depositing the body and support materials based on 3D digital data, such that, at least some of the slices are combined slices that include both a support region to be printed by the support material and a body region to be printed by the body material. The 3D digital data corresponding to cross section slices of the 3D object and the support structure may be stored in storage unit 46.

Storage unit 46 may store files that include design parameters of the 3D objects and the corresponding support structures to be printed by apparatus 10. For example, 3D computer aided design (CAD) files that include the design of the 3D object may be stored in storage unit 46. The files may include the dimensions and locations of the different regions of the 3D objects and the corresponding regions of the support construction.

Apparatus 10 may further include a user interface 50. User interface 50 may be or may include input devices such as, a mouse, a keyboard, a touch screen or pad or any suitable input device. It will be recognized that any suitable number of input devices may be included in user interface 50. User interface 50 may further include output devices such as: one or more displays, speakers and/or any other suitable output devices. It will be recognized that any suitable number of output devices may be included in user interface 50. Any applicable input/output (I/O) devices may be connected to controller 40 as shown by block 50. For example, a wired or wireless network interface card (NIC), a modem, printer or facsimile machine, a universal serial bus (USB) device or external hard drive may be included in user interface 50. User interface 50 may allow a user to upload or update codes and instructions for controlling printing of 3D objects according to some embodiments of the invention and/or to upload and updates files comprising the design of the 3D objects (e.g., computer aided design (CAD) files) into storage unit 46.

Tray 60 may be any tray that is suitable to support ink-jet printing of 3D objects and the corresponding support constructions. Tray 60 may be attached or connected to an X-Y table and may be controlled, e.g., by controller 40, to move in the X-Y plan according to the requirements of the printing process. Additionally or alternatively, tray 60 may be configured to move in the Z direction.

Controller 40 may control printing unit 20 and/or tray 60 to cause a relative movement between the tray and print heads 22, such that each of print heads 22 may deposit droplets of printing material (e.g., body or support materials) at a predetermined location in the X-Y plan and at a predetermined height at the Z direction.

Figure 2:
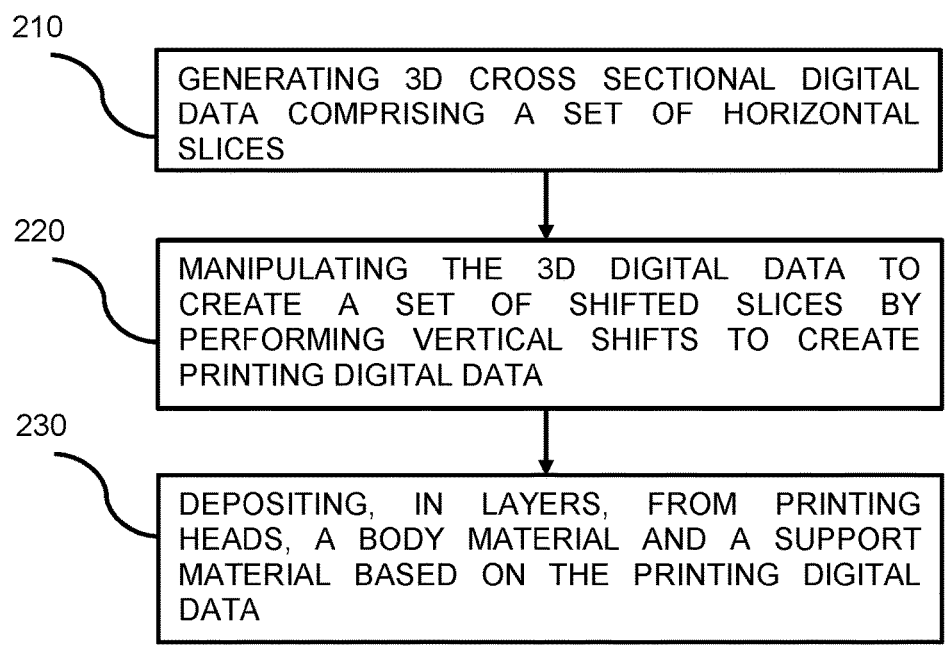
FIG. 2 is a flowchart of a method of printing a three-dimensional (3D) object and a support construction for the 3D object according to some embodiments of the invention.
Figure 3A:
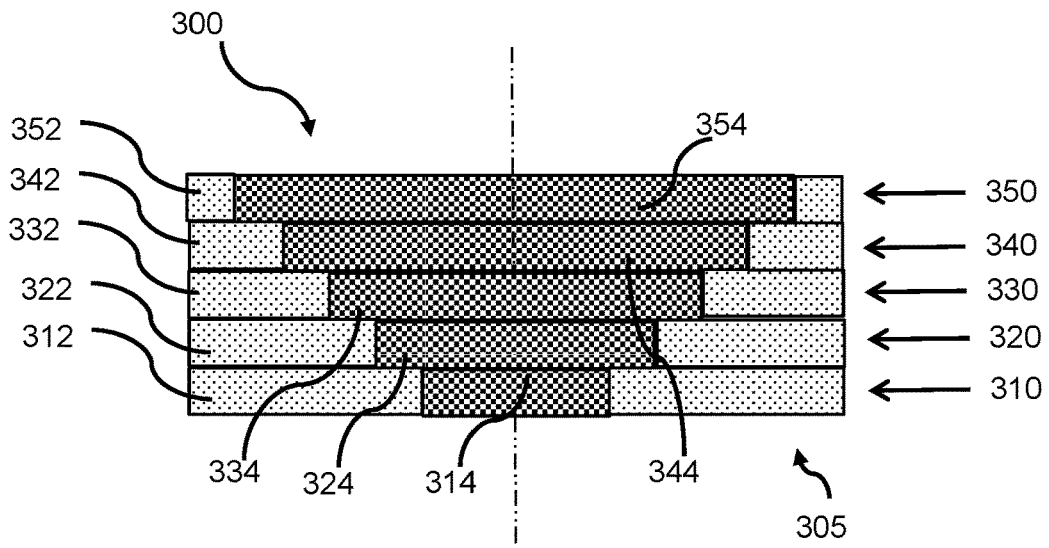
FIGS. 3A-3B are graphical representations of exemplary cross sectional digital data of an object and support construction according to some embodiments of the invention.
Figure 3B:
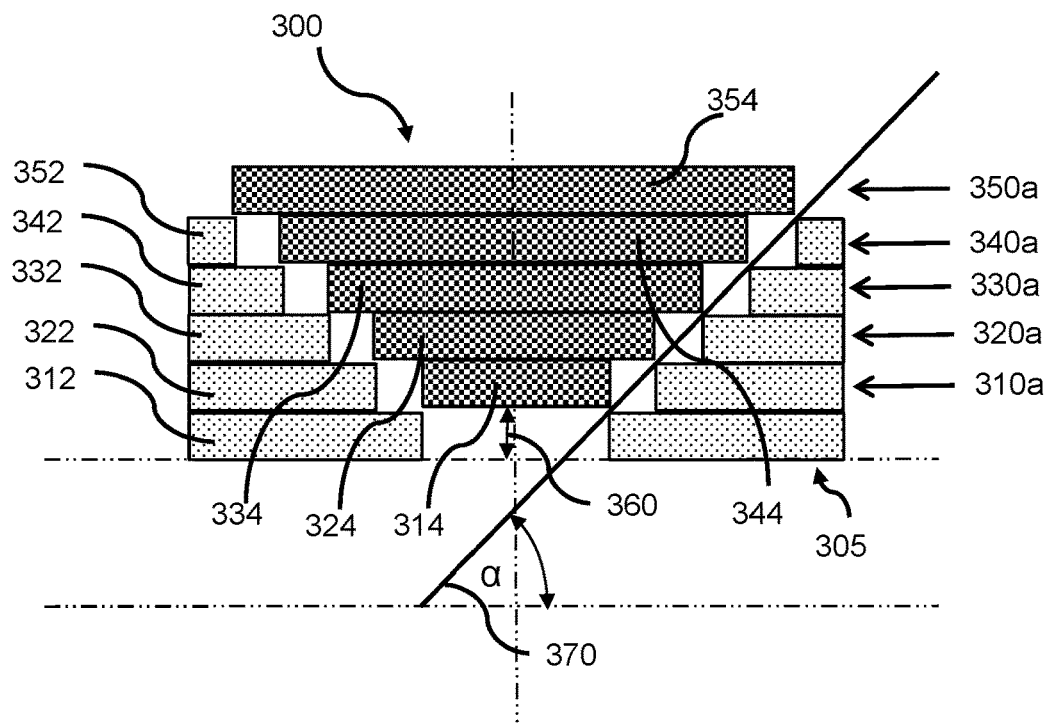

Reference is made to FIG. 2 which is a flowchart of a method of printing a 3D object and a support construction for the 3D object according to some embodiments of the invention. The method of FIG. 2 may be performed by a system such as system 10 or by any other suitable system. A 3D cross sectional digital data comprising a set of horizontal slices may be generated (Box 210), for example, by controller 40. A graphical representation of such cross sectional digital data is shown in FIGS. 3A and 3B. FIGS. 3A and 3B are illustrations of a cut in a 3D digital data of a 3D object 300 and a support construction 305. The 3D digital data may include 5 horizontal slices 310-350. As it should be understood by one skilled in the art that the 5 slices illustrated in FIGS. 3A-3B are given as an example and the invention is not limited to any number of slices.

In some embodiments, each of slices 310-350 includes one or more body regions 314-354 representing a horizontal cross section of 3D object 300, and at least each of some of the slices may further include one or more support regions 312-352 being adjacent to body regions 314-354 and representing a corresponding horizontal cross section of support construction 305. For example, slice 310 may include a support region 312 and a body region 314. In some embodiments, each slice includes one or more deposition layers, for example, two or more deposition layers.

Referring back to FIG. 2, the 3D cross sectional digital data may be manipulated, for example, by controller 40, to create a set of shifted slices 310a-350a (shown in FIG. 3B) by performing vertical shifts 360 between body region 314-354 and the support region 312-352 of a same horizontal slice (box 220). Shifted slices 310a-350a may create a printing digital data such that at least each of some of the shifted slices include a body region of one of the horizontal slices together with a support region of another one of the horizontal slice. For example, shifted slice 320a may include a body region 324 included originally in horizontal slice 320 and support region 332 included originally in horizontal slice 330.

In some embodiments, the method includes determining a size of vertical shift 360 (also referred to as "Z-gap") between body regions 314-354 and support regions 312-352 based on a geometrical relationship between 3D object 300 and support construction 305. For example, the geometrical relationship may be an angle α (illustrated in FIG. 3B) formed between a surface 370 representing the interface between body regions 314-354 and support regions 312-352 and the horizontal plan. In some embodiments, the angle α between adjacent body regions and support regions is up to 70°. Higher angle α requires a larger vertical shift 360. In another example, the geometrical relationship may include radius of curvature between the body regions and the support regions.

Figure 5:
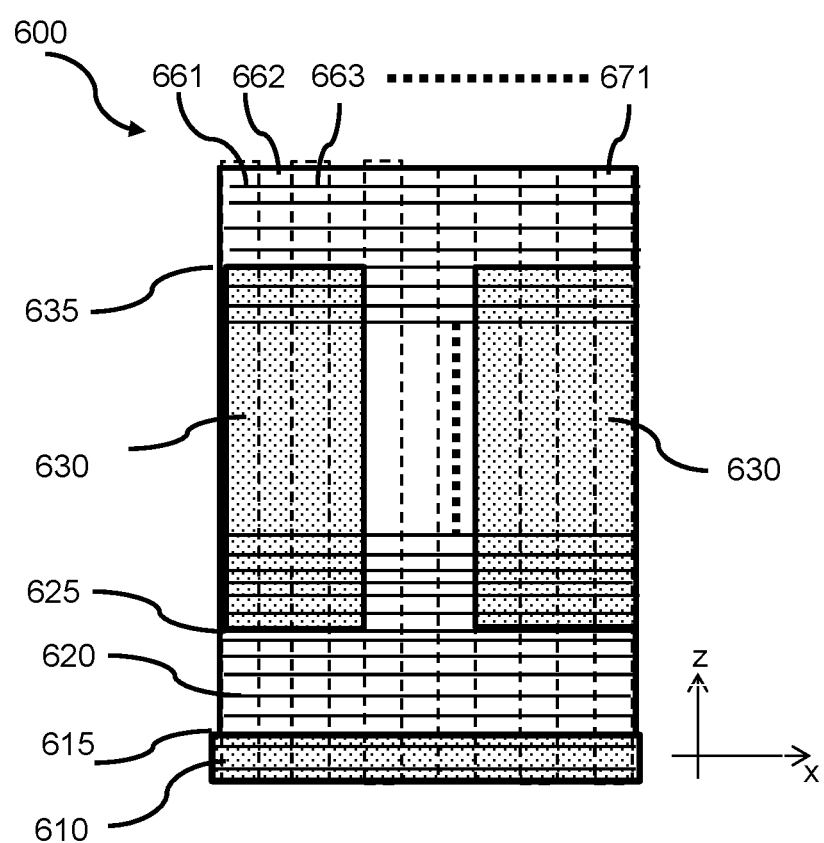
FIG. 5 is a graphical representation of exemplary cross sectional digital data of an object and support construction according to some embodiments of the invention.

In some embodiments, the 3D cross sectional digital data may further include a set of vertical columns 661-671, as illustrated and discussed in details with respect to FIG. 5. In some embodiments, each of columns 661-671 may include one or more slices of body regions 610 representing a vertical column of the 3D object, and at least each of some of the columns 661-671 may further include one or more slices of support regions 630 being vertically adjacent to the body region and representing a corresponding vertical column of the support construction. In some embodiments, manipulating the 3D digital data further includes adding to each column 661-671 a delay in the printing process between every vertically adjacent body region and support region.

Referring back to FIG. 2, controller 40 may control print heads 22 of printing unit 20 to deposit a body material and a support material (Box 230). The body material and support material may be deposited based on the printing digital data created in the operation of Box 220. In some embodiments, during the same deposition scan droplets of the support material and droplets of the body material travel different distances. For example, in the same deposition scan droplets of support material may be deposited to form support region 322 and droplets of body material may be deposited to form body region 314. The droplets of the body material may travel a longer distance from print head 22 than the droplets of the support material. The droplets of the body material may travel an extra distance equal to the "vertical shift" 360 until reaching their final position.

In some embodiments, the method further includes hardening the deposited body material and the deposited support material after at least some of the scans. For example, one or more hardening devices 24 may harden the deposited droplets after every scan (every deposited layer), or after the deposition of an entire slice, when the slice includes more than one deposition layer. In some embodiments, each scan may include depositing a single layer. In some embodiments, prior to depositing an additional slice, the entire deposited material may be hardened, to avoid forming a mixed interface between the support and body materials.

Figure 4:
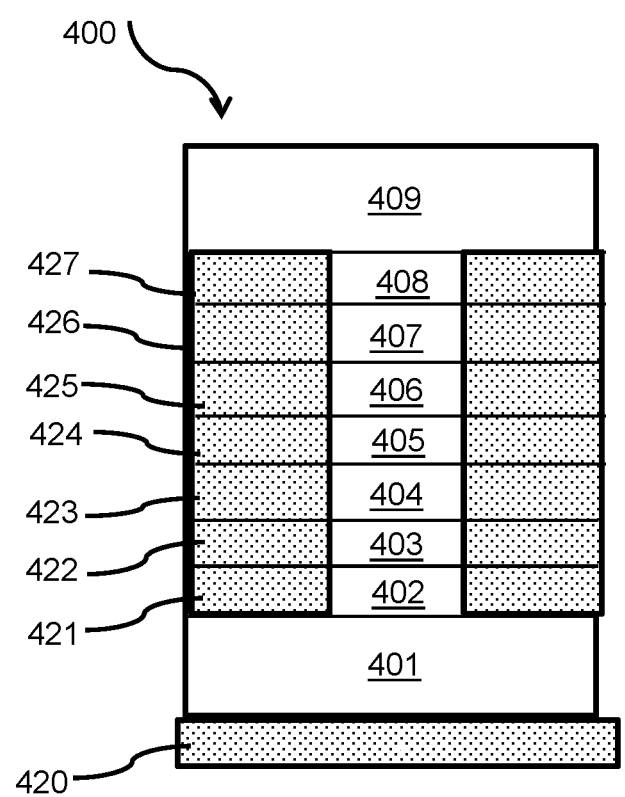
FIG. 4 is a graphical representation of exemplary cross sectional data of an object and support construction according to some embodiments of the invention.

A printing sequence according to some embodiments of the invention may be better understood in accordance to the graphical representation of the 3D cross sectional digital data in FIG. 4. An exemplary 3D cross sectional digital data of an object 400 may include a set of horizontal slices comprising a corresponding plurality of body regions 401-409 forming together, for example, an "I" shape 3D object and a plurality of support regions 421-427 forming together the support construction for the "I" shape 3D object. The size, dimension and location of each region of the 3D cross sectional digital data may be determined by computer simulation and the results of the simulation may be stored as CAD files in a storage unit associated with an apparatus for printing 3D objects, for example, storage unit 46 included in apparatus 10.

In some embodiments, object 400 may be printed according to some embodiments of the invention, for example, according to the method of FIG. 2. Object 400 may be manufactured using any apparatus that is configured to manufacture a 3D object by deposition of material layer by layer, for example, system 10.

Object 400 may be printed on or may include a base region 420 that may include two or more layers of the support material. The two or more layers may be deposited on a printing tray (e.g., tray 60) and hardened prior to printing the "I" shape 3D object.

In some embodiments, a body region 401 may be deposited on top of the hardened region 420. Body region 401 may include one or more layers of body material for building the "I" shape 3D object. The layers in region 401 may be deposited in a liquid state and may be hardened, for example, by hardening device 24, prior to the deposition of support region 421. Support region 421 may include one or more layers of support material. The material in the layers of support region 421 may be hardened prior to the deposition of body region 402, such that a mixed interface between the body material and the support material is not enabled. Region 402 may be horizontally adjacent to region 421.

In some embodiments, the same scan droplets of support material for forming support region 422 may be deposited on top of support region 421 simultaneously to the deposition of droplets of body material forming body region 402. A vertical shift in the size of the thickness of regions 421-427 may be formed between body region 402 and support region 421. The alternating depositions and hardening process of the regions may continue as long as an interface between the body material and support material when both in a liquid state or when an overlap between body and support material occur in an alternating manner is not enabled. For example, region 403 may be deposited in the same scan(s) with region 423, region 404 in the same scan(s) with region 424, region 405 with region 425, region 406 with region 426, region 407 with region 427. The last two regions to be deposited may be body structure regions 408 and 409.

Reference is made to FIG. 5 which is a graphical representation of 3D cross sectional digital data according to some embodiments of the invention. The 3D cross sectional digital data may include vertical columns comprising a plurality of deposited slices, wherein each column may be related to a single deposited spot at each slice. The information regarding the 3D digital data may include, if at a particular slice, at a particular column, a body material or a support material to be deposited. Each deposited spot or point may include a single droplet of ink, or may include more than one droplet of ink. For example, model 600 may be divided (in the x direction) into 11 columns 661-671. Each of columns 661-671 may include body material slices and/or support material slices. For example, column 661 may include, from bottom to top: 3 support slices 610, 6 body slices 620, 30 support slices 360 and 6 body slices 620. In some embodiments, each slice may include a single deposition layer.

In some embodiments, for each column a number and location of transition points between support material and body material may be determined. The transition points may be defined as the points where the printed material changes from support material to body material or vice versa. For example, column 661 has three transition points, 615, 625 and 635 where the printed material changes from support material to body material or vice versa.

The 3D cross sectional digital data may include a 2D matrix of vectors that may present the 3D model, where each vector presets a single column. The vector may include, counting from bottom to top the number of slices belongs to a first material until a first change in the material (i.e., transition point) then counting the number of layers of the second material until the second transition point, etc. For example, the vector presenting column 661 may have the form of:

{3-0, 6-1, 30-0, 6-1}

Wherein the first number at each pair of numbers stands for the number of slices and the second number stands for the material of the slice, for example, 0 for support material and 1 for body material.

An exemplary matrix for the two dimensional model 600 may include the following vectors:

Column 661: {3-0, 6-1, 30-0, 6-1}
Column 662: {3-0, 6-1, 30-0, 6-1}
Column 663: {3-0, 6-1, 30-0, 6-1}
Column 664: {3-0, 6-1, 30-0, 6-1}

Column 665: {3-0, 42-1}
Column 666: {3-0, 42-1}
Column 667: {3-0, 42-1}
Column 668: {3-0, 6-1, 30-0, 6-1}
Column 669: {3-0, 6-1, 30-0, 6-1}
Column 670: {3-0, 6-1, 30-0, 6-1}
Column 671: {3-0, 6-1, 30-0, 6-1}

In some embodiments, a delay in the printing process may be introduced in the transition points as a deposition delay of N printed slices (e.g., layers) at each transition point of each column. The deposition delay may be applied at each transition point such that after completing the deposition of the first material, for N deposited slices, no material is deposited at that particular point. For example, the deposition sequence of column 661, when N=7, may include depositing 3 layers of support material and not depositing any material in the following 7 depositions. Meaning that the print head (e.g., print head 22) does not drop any material in column 661 for 7 scans and only hardening device (e.g., device 24) heats or radiates the support material deposited 7 times allowing the support material to fully harden or cure. After the delay, 6 layers of body material may be deposited and another delay of 7 layers may be applied.

It is to be understood that each scan may include depositing material at desired places and hardening of each layer. So when the material deposition at a particular place (e.g., a column) is avoided only the hardening process is applied at that particular place. For example, after depositing the first 3 layers of support material in region 610, no material is to be deposited at any column and only the hardening device may scan the entire model 7 times.

An exemplary matrix for the two dimensional model 600, that includes a delay of 7 layers represented by the number 2 may include the following vectors that corresponds to columns 661-671:
{3-0, 7-2, 6-1, 7-2, 30-0, 7-2, 6-1}
{3-0, 7-2, 6-1, 7-2, 30-0, 7-2, 6-1}
{3-0, 7-2, 6-1, 7-2, 30-0, 7-2, 6-1}
{3-0, 7-2, 6-1, 7-2, 30-0, 7-2, 6-1}
{3-0, 7-2, 42-1}
{3-0, 7-2, 42-1}
{3-0, 7-2, 42-1}
{3-0, 7-2, 6-1, 7-2, 30-0, 7-2, 6-1}
{3-0, 7-2, 6-1, 7-2, 30-0, 7-2, 6-1}
{3-0, 7-2, 6-1, 7-2, 30-0, 7-2, 6-1}
{3-0, 7-2, 6-1, 7-2, 30-0, 7-2, 6-1}

In some embodiments, depositing the object layer by layer according to the determined slices and columns may include applying the delay at each transition point by not depositing any material for N layers, wherein each layer is deposited at a single scan. For example, the next 7 layers deposited after transition point 625 may include, not depositing any material at columns 661-664, depositing body material at columns 665-667 and not depositing any material at columns 668-671, hardening the body material after each layer. The deposition of the 8$^{th}$ layer, above point 625, may include depositing support material at columns 661-664, depositing body material at columns 665-667 and again support material at columns 668-671, followed by additional curing scans with no further deposition of material in order to fully harden the support material deposited. The support material at columns 661-664 and 668-671 may be dropped 7 layers lower than the body material in column 665-667, accordingly, in some embodiments, the delay may be equal to the vertical shift.

Some embodiments of the invention may be related to a roller-less deposition process. In some embodiments, material is deposited at at least two different heights, as illustrated and discussed with respect to FIGS. 2-5. When depositing together two regions at two different heights (e.g., at a vertical shift), for example, regions 322 and 314, it may be difficult to level each deposited layer by using a leveling device, for example, leveling device 26. In some embodiments, in order to avoid the deposition of excess material and the need to use the leveling device, not all the droplets included in a layer are deposited. For example, apparatus 10 may deposit droplets of body or support material only at 80% of the places in which a droplet may be deposited. The not deposited "vacancies" may be filled with material from the excess material deposited in the 80% places of the layer. The number and location of the vacancies may be such that substantially no excess material may be deposited.

Figure 6A:
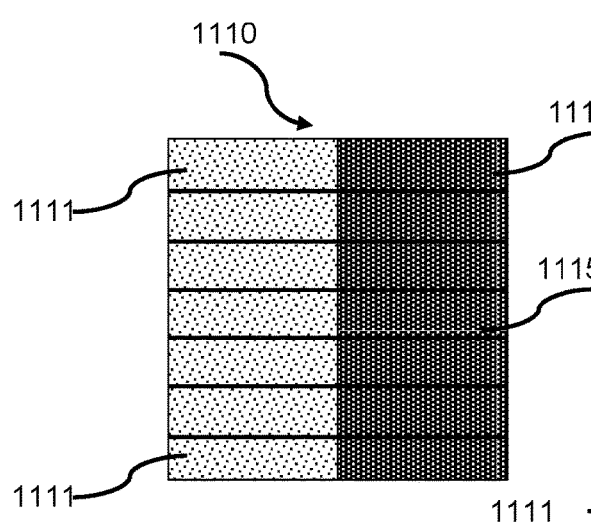
FIGS. 6A-6C are graphical representations of exemplary cross sectional data of objects and support constructions according to some embodiments of the invention.
Figure 6B:
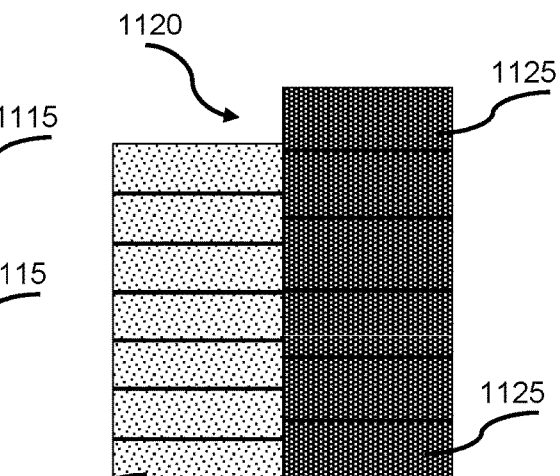
Figure 6C:
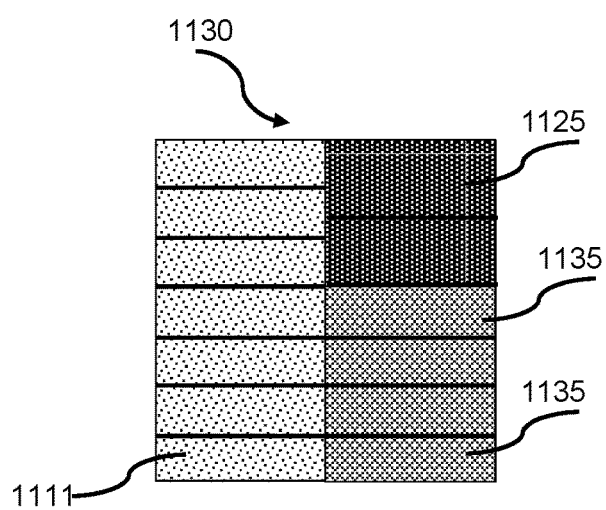

Reference is made to FIGS. 6A-6C that are illustrations of graphical representations of exemplary cross sectional data of objects and support constructions according to some embodiments of the invention. Objects 1110, 1120 and 1130 may be deposited using at least two materials (e.g., body material and a support material) layer by layer. Object 1110 may be deposited using prior art methods such that at each deposition scan both first material regions 1111 and second material regions 1115 may be deposited simultaneously at the same height, such that after each deposition scan (or every several deposition scans) a leveling device may level the deposited layer(s) such that each adjacent regions 1111 and 1115 may have the same height.

Object 1120 may be deposited using the deposition methods disclosed in FIG. 2. The method may include depositing the first bottom region 1111 from the first material, leveling and curing each layer and then depositing the first 1125 region from the second material and second region 111 from the second material in the same scans. Since the second material in region 1125 is deposited below first region 1111, the leveling device cannot level the access second material deposited. When a droplet is being deposited, it flattens and occupies a larger area than the diameter of the droplet, such that neighboring deposited droplets overlap each other, forming excess material in some areas over the surface. This excess material should be removed in order to maintain a controlled height of each region. When the excess material is not removed the height of the region cannot be controlled. Therefore, if the deposition sequence continue without removing the excess material in regions 1125 by the leveling device, each region 1125 may include more deposited material than in each region 1111 where the excess material has been removed by the leveling device, and may be higher than region 1111, resulting in an uneven final height of object 1120.

In some embodiments, in order to solve this problem, at least some of the second material that was expected to be deposited in each layer forming region 1125 is not deposited and a vacancy (a place where no material is deposited) is "deposited". The amount of vacancies may be calculated such that no leveling may be needed and the height of at least some of the regions deposited from the second material may be substantially similar to the height of the regions deposited using the first material.

The amount of material not deposited using the vacancies may be substantially equal to the amount of excess material that may be removed by the leveling device. For example, if the leveling device removes 15% of the material deposited in a single scan, only 85% of the material may be deposited in regions where the leveling device may not be in direct contact during the leveling process (due to the Z-gap). In other words, 15% of the droplets of the second material that are supposed to be dropped in a single scan are vacancies.

Object 1130 illustrated in FIG. 6C may include two parts deposited from two different materials. Object 1130 may be deposited using the method disclosed in FIG. 2. The left part of object 1130 may include regions 1111 deposited by dropping droplets of the first material and the right part may include regions 1135 and 1125 deposited by dropping droplets of the second material. Following the deposition of any one of regions 1111, the leveling device may level the deposited material. The first region 1135 of the second material may be deposited after the deposition of at least one region 1111, and therefore cannot be leveled by the leveling device. In order for the final region 1135 to be at the same height as region 1111, less material may be deposited in region 1135 in comparison to the corresponding adjacent region 1111.

In some embodiments, at a predetermined number of printing spots at region 1135, no droplets are being placed and a vacancy is formed. The vacancies may be filed with material from neighboring droplets being deposited. The amount of material to be deposited may be proportional to the amount of material that was remained in region 1111 after the leveling process. For example, if 80% of the first material that was deposited in region 1111 is remained after the leveling process only 80% of the original amount of the second material may be deposited in region 1135.

In some embodiments, an alternative approach to reducing the excess material may be taken as illustrated and demonstrated in regions such as regions 1125. In regions 1125 all the material may be deposited (i.e., no vacancies are introduced into the printing instructions). The printing method may include instructions to deposit a predetermined number of regions with a reduced amount of material (e.g., regions 1135) and additional predetermined number of regions with full amount of material (e.g., regions 1125) such that the overall height of all deposited regions of the second material may not exceed the overall height of all deposited regions of the first material (that include regions 1111). The last layer of the second material being deposited many be leveled using the leveling device.

Figure 7A:
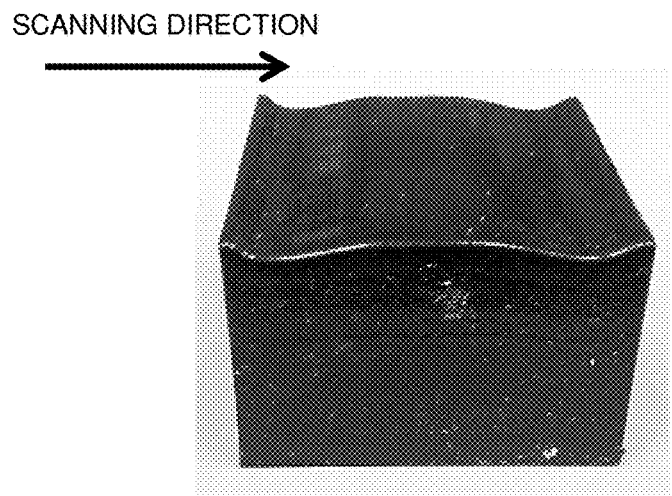
FIG. 7A is an image of an exemplary printed object according to some embodiments of the invention.

In some embodiments, the vacancies or placed where no droplets are to be deposited are located a predetermined areas over the surface of the printed object. When all the droplets are being deposited and no leveling device levels the deposited droplets, the outcome may be an uneven height of the deposited object or region, as illustrated for example, in FIG. 7A. FIG. 7A is an exemplary printed object according to some embodiments of the invention. An amount of excess material may be formed in the side and middle section of the deposited region. When a leveling device levels the deposited material the excess material in the sides and the middle sections may be removed. In order to avoid such unevenness when not using a leveling device (e.g., when applying the method of FIG. 2), vacancies may be introduced at areas when mores excess material is to be deposited, such as the sides and the middle sections of the printed region of FIG. 7A.

Figure 7B:
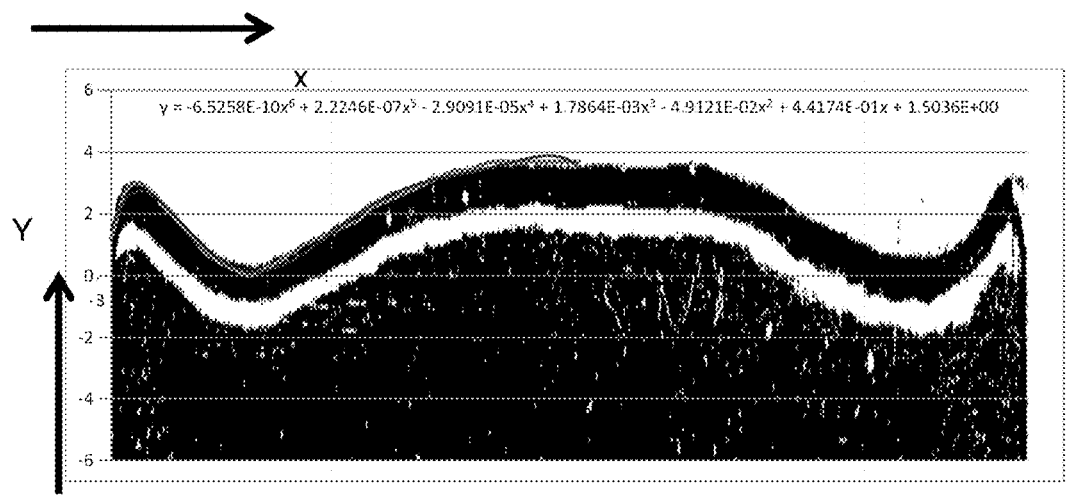
FIG. 7B is a cross section image of the exemplary printed object of FIG. 7A and a graph that matches the surface curvature of the printed object according to some embodiments of the invention.

In some embodiments, the vacancies may be located according to a profile that follows the expected excess deposition, as illustrated in FIG. 7B. FIG. 7B which is a cross section of the exemplary printed object of FIG. 7A and a graph (a grey line) of an exemplary profile that matches the surface curvature of the printed object. Equation (1) is a function of the graph the follows the profile of the cross section:

$$Y = A_1 x^{n1} * e^{-\frac{x}{L_1}} + A_2 \bigg/ \left(1 + \frac{x - x_2}{L_2}\right)^{n2} \qquad (1)$$

Where: x is the distance from the edge of the printed region in the scanning direction, Y is the profile as a function of x and $A_1$, $A_2$, $L_1$, $L_2$, $n_1$, $n_2$ and $x_2$ are known constants. The amount of vacancies to be introduced into the printing instructions may be according to a function, such as the function of Equation (1).

In some embodiments, when the angle α (illustrated in FIG. 3B) is above 70°, for example, between 70° and 90°, in order to further ensure that no contact is made between a deposited support material layer and a deposited body material layer, a gap may be formed between regions deposited with the support material and those deposited with the model material. The gap may be a horizontal gap or an angular gap. In some embodiments, after depositing a predetermined number of layers or a predetermined high of deposited material, with a gap, the gap may be closed by depositing additional support material or additional model material, such that at least some of the deposited layers extend beyond the previously deposited layers, forming a negative angle.

Figure 8A:
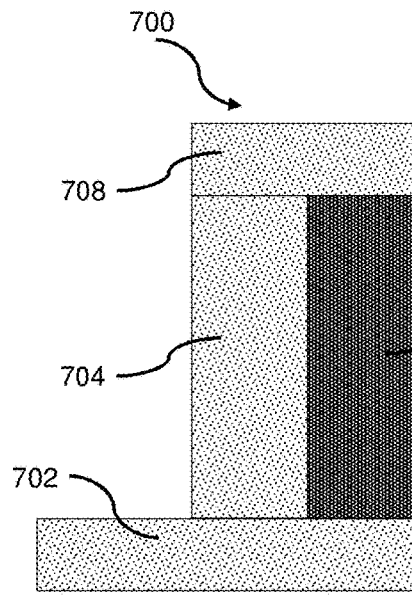
FIGS. 8A and 8B are exemplary printed objects according to some embodiments of the invention.
Figure 8B:
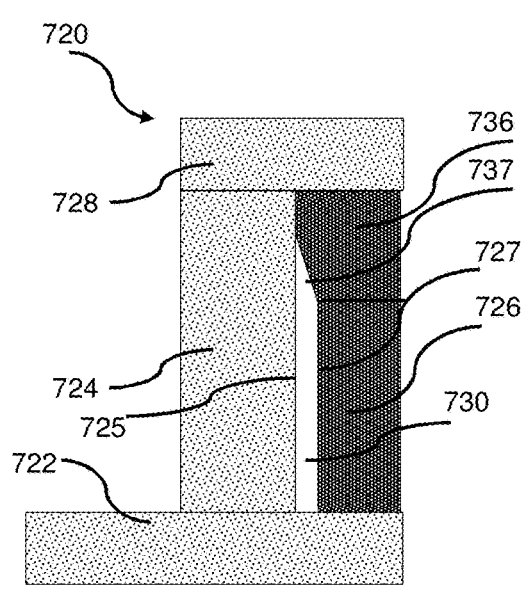

Reference is now made to FIG. 8A illustrating an object printing according to known methods and further to FIG. 8B illustrating a 3D object according to some embodiments of the invention. As shown in FIG. 8A there is no gap between body and support portions. An object 700 may include a base portion 702, a substantially vertical portion 704 and a top portion 708. Portions 702, 704 and 708 may include a first material, for example, a body material. Portion 704 may not need to be vertical and may include at least one wall having an angle, for example, 1-30°, with respect to base portion 702. Object 700 may further include portion 706 that includes a second material, for example, a support material. In some embodiments, portions 702, 704 and 708 may include a support material and portion 706 may include a model material.

Portions 704 and 706 may be printed simultaneously layer by layer such that no gap is formed between the portions. In some embodiments, the quality of the interface between portions 704 and 706 may be of a low quality, since both the first material and the second material are deposited simultaneously in a single layer, forming a mixed interface. In order to avoid such a mixed interface, a gap may be formed between the portions. An example of an object printed such that a gap is formed between the support material and the body materials is given in FIG. 8B.

Figure 10:
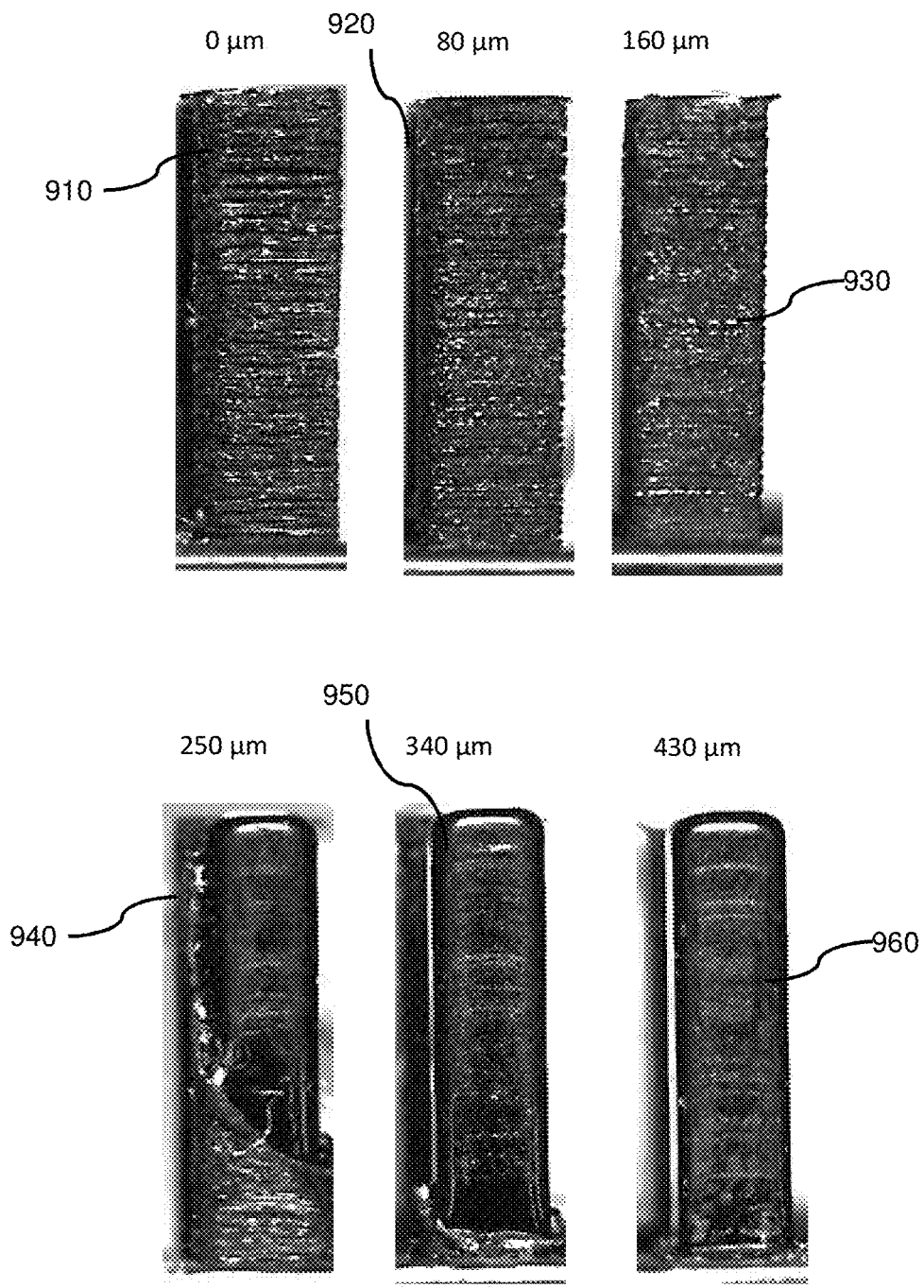
FIG. 10 includes images of exemplary printed objects according to some embodiments of the invention.

An Object 720 may include a base portion 722 and a portion 724 having at least one substantially vertical wall 725. In some embodiments, wall 725 may have an angle, for example, 1-30°, with respect to the upper surface of base portion 722. Object 720 may further include top portion 728. Portions 722, 724 and 728 may include a first material, for example, a model material. Object 720 may further include, a portion 726 having at least one substantially horizontal wall 727 and a portion 736 deposited on top of portions 726. In some embodiments, wall 727 may have an angle, for example, 1-30°, with respect to the upper surface of base portion 722. Portions 724 and 726 may be printed or deposited layer by layer such that a gap 730 is formed between wall 725 and wall 727. The gap may have a width of at least 100 μm, for example, between 200 μm-500 μm. Examples of the influence of the width of the gap on the surface quality are shown in the images of FIG. 10, discussed below. Portion 736 deposited on top of portion 726, such that gap 730 is gradually closed by depositing the second material at a negative angle 737. Negative angle 737 may be of at least 1°, for example, between 5° and 25°.

Figure 9:
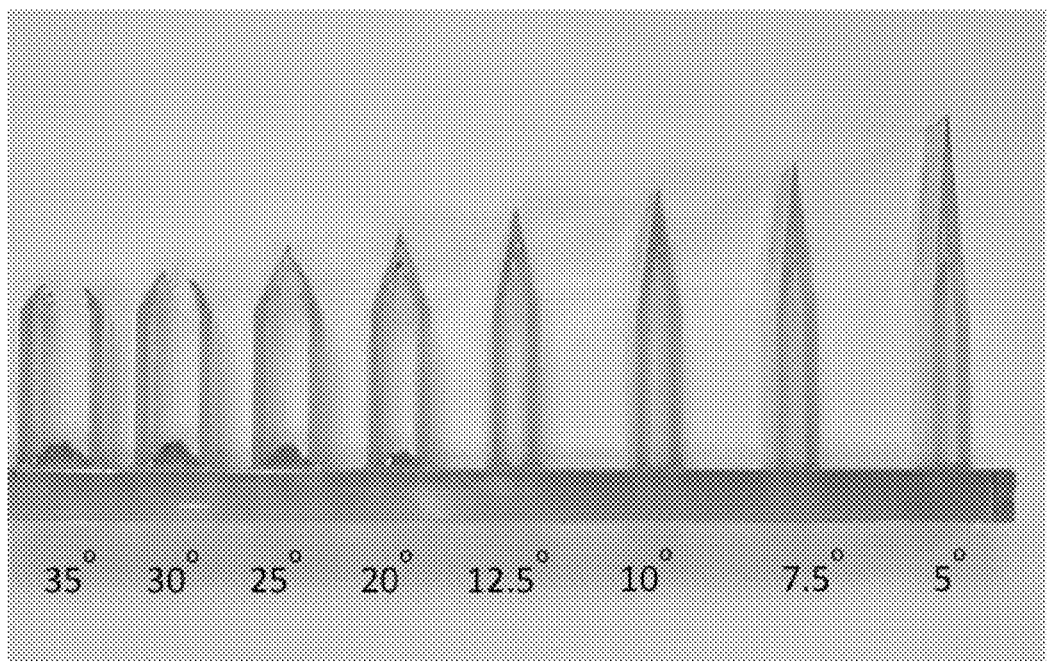
FIG. 9 is an image of exemplary support structures according to some embodiments of the invention.

Reference is now made to FIG. 9, showing images of objects made of support material printed at various negative angles, according to some embodiments of the invention. Eight pairs, each having a substantially vertical portion and a portion having a negative angle are shown. Each pair was deposited such that a gap form between the two portions forming the pair is potentially closed when the portions having negative angles are deposited. For each pair negative angle is written below the respective image. It can be seen that up to 12.5°, the gap is well closed by a solid construction. Depositing a portion having a negative angle larger than 25° caused a partial clash of the portion, while the gap remains open.

Objects 700 and 720 may be printed or deposited using an inkjet printing system, such as system 10 of FIG. 1. Object 720 may be printed by depositing on a substrate at least two different materials, for example, a body material and a support material. A first portion, e.g., portion 724, may be deposited from a first material layer by layer and a second portion, e.g., portion 726, may be deposited from a second material, layer by layer, such that a gap (e.g., gap 730) may be formed between a surface of the first portion (e.g., wall 725) and a surface of the second portion (e.g., wall 727). In some embodiments, the layers of the first and second portions may be deposited simultaneously, such that at a single deposition scan both a layer of the first portion and a layer of the second portion are deposited at substantially the same height. The gap may be larger than 200 μm.

After a predetermined number of layers of the first and second portions, the gap may be closed by printing a third portion (e.g., portion 736) from the second material on top of the second portion (e.g., portion 726) layer by layer such that at least some of the deposited layers extend beyond the surface of the second portion (e.g., wall 727) (towards the surface of the first portion (e.g., wall 725)) to form a negative angle in the third portion. The negative angle may be higher than 1°, for example, higher than 5°. In some embodiments, the first portion may further be deposited layer by layer simultaneously to the deposition of the third portion, at least until the gap is closed.

In some embodiments, the size of the negative angle may be determined based on the viscosity of the second material during the deposition. The higher the viscosity of the second material, the larger the negative angle may be. In some embodiments, the size of the negative angle may be determined based on a surface tension of a droplet of the second material. The higher the surface tension, the higher the negative angle may be. In some embodiments, the size of the negative angle may be determined based on the velocity of the droplets of the second material during deposition.

In some embodiments, the second and third portions (e.g., portions 726 and 736) may be removed from the object to form the final model.

Results of experimental depositions of support and body material such that a gap is formed between the support and body material is presented in FIG. 10. FIG. 10 includes images of exemplary printed objects according to some embodiments of the invention. Objects 910-960 were printed using a body material to form an internal bar and a support material to cover the vertical walls of each bar. An object 910 was printed such no gap is formed between the support and the model material, as illustrated for example, in FIG. 8A. Objects 920 and 930 were printed with narrow gaps of, 80 μm and 160 μm respectively, between the support and body portions of objects 920 and 930. In objects 910-930 is was impossible to remove the support material and have smooth, glossy, high quality surface of the body bars. Objects 940, 950 and 960 were printed such that gaps of 250 μm, 350 μm and 430 μm respectively, were formed between the body and the support portions of the objects. As can be see, smooth, glossy, high quality surfaces of the body material bar was obtained.

Figure 11A:
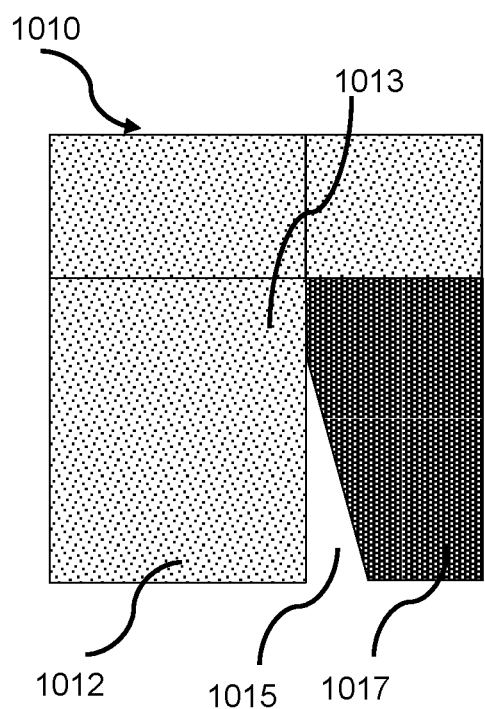
FIGS. 11A and 11B are exemplary printed objects according to some embodiments of the invention.
Figure 11B:
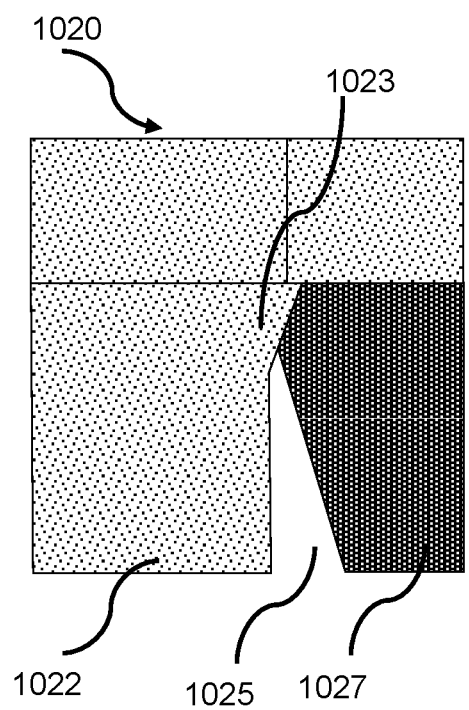

In some embodiments, after completing the third portion of the object having the negative angle, an additional material may be deposited to form a buffer zone. FIGS. 11A and 11B illustrate two exemplary printed objects according to some embodiments of the invention. Objects 1010 and 1020 may include body portions 1012 and 1022, gaps 1015 and 1025 and support portions 1017 and 1027, respectively. Gaps 1015 and 1025 may have negative angles according to embodiments of the invention. Gaps 1015 and 1025 may be closed by printing buffer zones in the contact between the body portions and the support portions. Object 1010 may include a straight buffer zone 1013 and object 1020 may include an angular buffer zone 1023. Buffer zones 1013 and 1023 are given as examples only. Buffer zones according to the invention may have any desirable geometry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of printing a three-dimensional (3D) object and a support construction for the 3D object, the method comprising:
generating 3D cross sectional digital data comprising a set of horizontal slices, wherein each of the slices includes one or more body regions representing a horizontal cross section of the 3D object, and at least each of some of the slices further includes one or more support regions being adjacent to the body regions and representing a corresponding horizontal cross section of the support construction;
manipulating the 3D digital data to create a set of shifted slices by performing vertical shifts between the body region and the support region of a same horizontal slice to create printing digital data, wherein at least each of some of the shifted slices include a body region of one of the horizontal slices together with a support region of another one of the horizontal slices; and
depositing, in layers, from printing heads, a body material and a support material based on the printing digital data, wherein in a same scan, droplets of the support material and droplets of the body material travel different distances.

2. The method of claim 1, wherein depositing comprises creating a region of the 3D object related to a particular horizontal cross section together with a region of the support construction related to a different horizontal cross section layer in the same scan.

3. The method of claim 1, further comprising:
determining a size of the vertical shift between the body region and the support region based on a geometrical relationship between the 3D object and the support construction.

4. The method of claim 3, wherein the geometrical relationship is an angle formed between a surface representing the interface between the body regions and the support regions and the horizon.

5. The method of claim 4, wherein a higher angle requires a larger vertical shift.

6. The method of claim 1, wherein the 3D cross sectional digital data further comprises a set of vertical columns, wherein each of the columns includes one or more slices of body regions representing a vertical column of the 3D object, and at least each of some of the columns further includes one or more slices of support regions being vertically adjacent to the body region and representing a corresponding vertical column of the support construction, and wherein manipulating the 3D digital data further includes adding to each column a delay in the printing process between every vertically adjacent body region and support region.

7. The method of claim 1, further comprising:

hardening the deposited body material and the deposited support material after at least some of the scans.

8. The method of claim 1, wherein each slice includes two or more deposition layers.

9. The method of claim 1, wherein, manipulating the 3D digital data further comprises, creating vacancies in at least some of the slices such that after depositing all the layers both the 3D object and the support structure are at the same height, wherein in each vacancy no support material or body material is dropped.

* * * * *